UNITED STATES PATENT OFFICE.

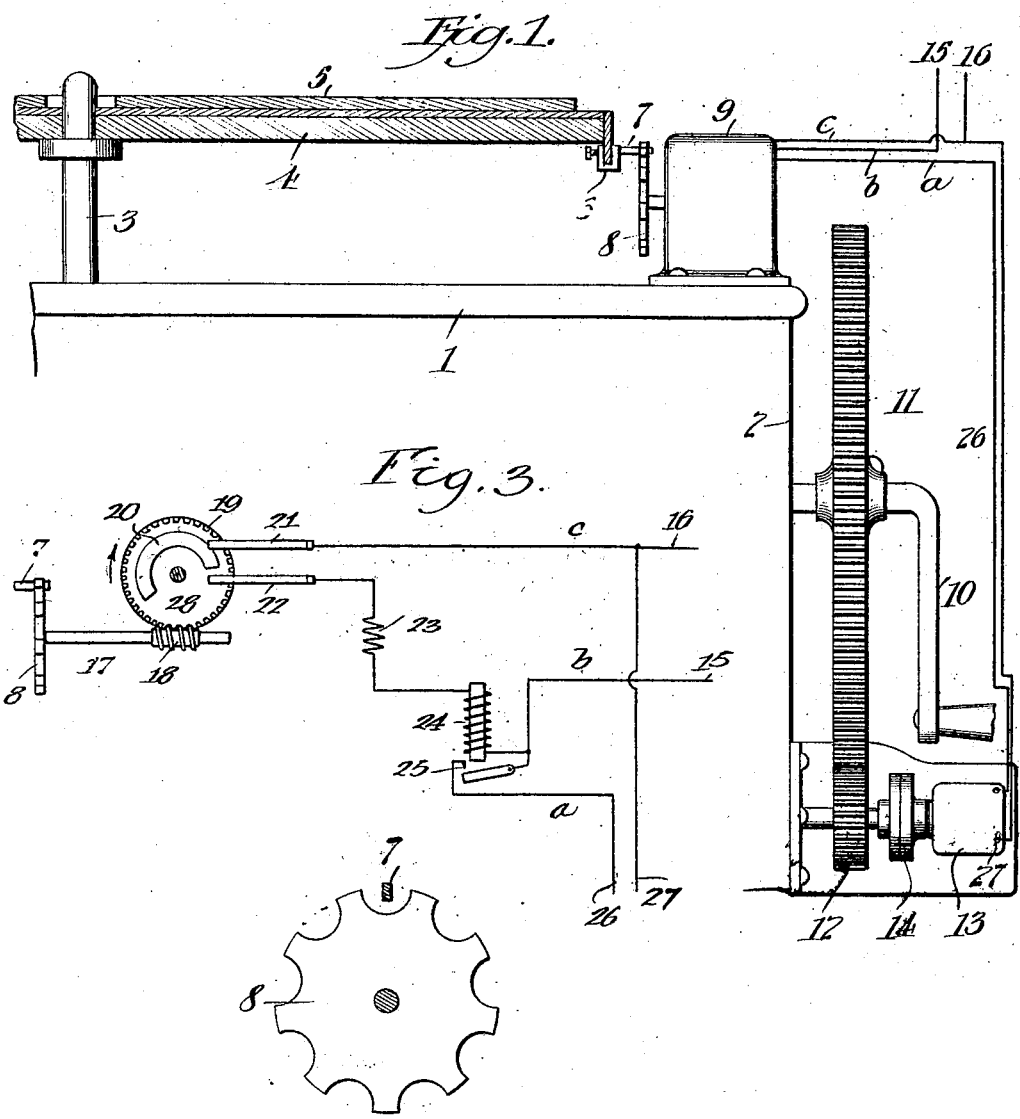

HARRY RANDOLPH VAN DEVENTER, OF SUMTER, SOUTH CAROLINA, ASSIGNOR TO SPLITDORF ELECTRICAL COMPANY, OF NEWARK, NEW JERSEY, A CORPORATION OF NEW JERSEY.

DRIVING MEANS FOR TALKING-MACHINES.

1,262,415.  Specification of Letters Patent.  Patented Apr. 9, 1918.

Application filed October 12, 1914. Serial No. 866,270.

*To all whom it may concern:*

Be it known that I, HARRY RANDOLPH VAN DEVENTER, a citizen of the United States, residing at Sumter, in the county of Sumter and State of South Carolina, have invented certain new and useful Improvements in Driving Means for Talking-Machines, of which the following is a specification, reference being had to the accompanying drawing.

This invention relates to automatic winding means for talking machines and contemplates the provision of mechanical means that can be attached to the ordinary talking machine commonly provided with manual means for winding, whereby without interfering with said manual means, the machine may be automatically wound.

A further object is to provide a talking machine with winding means that will operate when the spindle carrying the sound record has made a certain predetermined number of revolutions.

Another object is to provide a device that will not wind the talking machine motor too tight.

There are other objects as hereinafter described and claimed.

In the accompanying figures, Figure 1 is a diagrammatic view partly in section of the attachments as applied to a disk talking machine, such as the Victrola. Fig. 2, a view of the impulse wheel used in the control device, and Fig. 3, a diagram showing how the control of the winding motor may be accomplished. Like figures of reference denote the same parts wherever they are shown.

1 denotes the top of the talking machine, and 2 the side thereof. 3 is a vertically projecting spindle on the top of which is supported the table 4 for the purpose of holding the sound record 5. Usually 4 is provided with a flange and clamped to the edge of this is the member 6 having a projecting pin 7 adapted to engage the star wheel 8 of the control mechanism 9.

Talking machines are usually provided with a crank 10 which is so connected to the driving motor, that the motor is wound by rotating the crank in one direction, the crank remaining stationary while the motor is running. I clamp to this winding crank a suitable gear 11, or the crank 10 may be entirely taken off and the gear 11 mounted on a new shaft engaging the winding mechanism in place of the crank.

Meshed with 11 is a suitable gear 12 connected to an electric motor 13. 12 may be directly on the shaft of 13 or interposed between the motor and gear may be any suitable clutch 14, to prevent overwinding, as it is obvious that when the tension of the spring overcomes the friction of clutch 14, that 14 will slip and thereby prevent overwinding or stalling the motor.

The control mechanism 9 may be of any suitable character, either a suitable electric device or a clock work arranged to perform the following functions:

(a) The number of revolutions that table 4 is to make with one winding of its driving motor having been decided upon, say 500, the control mechanism is so arranged that upon the completion of the aforesaid number of revolutions, an electrical circuit from a suitable current source to which the wires 15 and 16 lead is closed to the electric motor 13. (b) The electric motor 13 is permitted to run, thereby rewinding the spring motor. (c) When the spring motor is rewound to a predetermined point, the electrical circuit through winding motor 13 is broken.

The foregoing may be accomplished in many ways that will suggest themselves to those skilled in the art and for the sake of illustration, I show in Fig. 3 one arrangement by which the foregoing results may be accomplished. I deem this and all other arrangements within the scope of my invention, which consists broadly in having a controlling mechanism operated by the revolving table of a talking machine and forming an attachment thereto, which controls the circuit to an electric winding motor.

Referring to Fig. 3, wheel 8 is connected to the shaft 17 provided with a worm 18, which is meshed with the gear 19 which carries the segment 20 adapted to close the circuit between brushes 21 and 22, thus permitting current to flow over conductor 16 to brush 21 to segment 20, to brush 22, when the segment is between the brushes, through resistance 23, through a winding on relay 24 and over conductor 15. This causes relay 24 to close its contact 25 and permit current to flow through conductor 26 to motor 13, the circuit being completed over conductor 2 to 16. It will be observed that with gear 19 rotating in the direction of the arrow, the brushes 21 and 22 will be connected to each other while segment 20 is sliding under them. The length of segment 20 is readily calculated so that the duration of time during which the current is connected to the motor 13 is just sufficient to rewind the spring motor of the talking machine to the same tension that it was before table 4 made the 500 revolutions before referred to.

Now it may be possible that instead of the gear 19 coming to rest, so that brush 22 would be in the space 28, in other words, so that no current was flowing, that the device might stop with brushes 21 and 22 in contact, therefore I provide a suitable resistance 23 so proportioned that if the current is allowed to flow through same a longer time than is approximately necessary for the motor 13 to rewind the spring to the desired point, 23 will heat and thereby its resistance increase to the point where relay 24 will no longer hold its contact 25 closed, and will thereby release its contact and open the circuit through the motor.

While I have described and shown one method of controlling the electric motor, it will be understood that other methods may be used without departing from the spirit of the invention as set forth in the appended claims.

I am aware that it is old to equip talking machines with electrically driven winding motors, but I claim as new the controlling device and electric motor attachment herein described, both of which may be readily attached to talking machines already in service.

I claim—

1. An attachment for spring motor operated talking machines of the motor inclosed type, including in combination, an inclosed electric motor located outside of the casing of the talking machine, driving connections between the electric motor and the normal spring winding shaft, and controlling means located outside of the casing and operated by a movable part of the talking machine normally outside of the casing for controlling the operation of the electric motor, whereby said electric motor automatically maintains said spring motor wound.

2. An attachment for spring motor operated talking machines of the motor inclosed type including in combination, an inclosed electric motor located outside of the casing of the talking machine, driving connections between the electric motor and the normal spring winding shaft, and controlling means located outside of the casing and operated by a movable part of the talking machine normally outside of the casing for completing the circuit to cause the electric motor to wind the machine and for breaking the circuit when said spring motor is wound.

3. An attachment for spring motor operated talking machines including in combination, an inclosed electric motor attached to the outside of the casing of the talking machine, driving connections between the electric motor and the spring winding mechanism, controlling means operated by a moving part of the talking machine for completing the circuit to cause the electric motor to wind the machine, and means for stopping the motor to prevent overwinding provided the talking machine stops with the circuit completed.

4. An attachment for spring motor operated talking machines including in combination, an inclosed electric motor attached to the outside of the casing of the talking machine, and driving connections between the electric motor and the spring winding mechanism, said driving connections including a friction clutch adapted to slip to prevent overwinding of the talking machine, controlling means operated by a moving part of the talking machine for completing the circuit to cause the electric motor to wind the machine, and means for stopping the motor to prevent overwinding provided the talking machine stops with the circuit completed.

5. An attachment for spring motor operated talking machines including in combination, an inclosed electric motor attached to the outside of the casing of the talking machine, driving connections between the electric motor and the spring winding mechanism, and inclosed controlling means operated by the rotating table of the talking machine for completing the circuit to cause the electric motor to wind the machine.

6. An attachment for spring motor operated talking machines including in combination, an inclosed electric motor attached to the outside of the casing of the talking machine, driving connections between the electric motor and the spring winding mechanism, and inclosed controlling means operated by the rotating table of the talking machine for completing the circuit to cause the electric motor to wind the machine, said controlling means also operating to break the circuit to stop the electric motor after a predetermined number of revolutions of the table.

7. An attachment for spring motor operated talking machines including in combination, an inclosed electric motor attached to the outside of the casing of the talking machine, driving connections between the electric motor and the spring winding mechanism, inclosed controlling means operated by the rotating table of the talking machine for completing the circuit to cause the electric motor to wind the machine, and means for stopping the motor to prevent overwinding provided the table stops with the circuit completed.

8. An attachment for spring motor operated talking machines including in combination, an inclosed electric motor attached to the outside of the casing of the talking machine, driving connections between the electric motor and the spring winding mechanism, inclosed controlling means operated by the rotating table of the talking machine for completing the circuit to cause the electric motor to wind the machine, said controlling means also operating to break the circuit to stop the electric motor after a predetermined number of revolutions of the table, and means for stopping the motor to prevent overwinding provided the table stops with the circuit completed.

9. An attachment for spring motor operated talking machines including in combination, an inclosed electric motor attached to the outside of the casing of the talking machine, driving connections between the electric motor and the spring winding mechanism, inclosed controlling means operated by the rotating table of the talking machine for completing the circuit to cause the electric motor to wind the machine, a relay, contacts controlled thereby, and means operated to open the relay to stop the electric motor provided the table stops with the circuit completed.

10. An attachment for spring motor operated talking machines including in combination, an inclosed electric motor attached to the outside of the casing of the talking machine, driving connections between the electric motor and the spring winding mechanism, inclosed controlling means operated by the rotating table of the talking machine for completing the circuit to cause the electric motor to wind the machine, a relay, contacts controlled thereby, and a resistance in circuit with the relay, said resistance operating to open the relay to prevent overwinding provided the table stops with the circuit completed.

11. The combination with driving means for a talking machine including a spring motor, of an electric motor, driving connections between the electric motor and the spring motor for winding the spring motor, controlling means operated by a moving part of the talking machine for completing the circuit to cause the electric motor to wind the machine, and means for stopping the motor to prevent overwinding provided the talking machine stops with the circuit completed.

12. The combination with driving means for a talking machine including a spring motor, of an electric motor, driving connections between the electric motor and the spring motor for winding the spring motor, controlling means operated by a moving part of the talking machine for completing the circuit to cause the electric motor to wind the machine, a relay, contacts controlled thereby, and means for operating the relay to stop the electric motor to prevent overwinding provided the talking machine stops with the circuit completed.

13. The combination with driving means for a talking machine including a spring motor, of an electric motor, driving connections between the electric motor and the spring motor for winding the spring motor, said driving connections including a friction clutch for preventing overwinding, controlling means operated by a moving part of the talking machine for completing the circuit to cause the electric motor to wind the machine, said controlling means also operated to stop the electric motor when the spring has been rewound provided the operating machine continues its operation, and means for stopping the electric motor to prevent overwinding of the spring provided the talking machine stops with the circuit completed.

In testimony whereof I hereunto affix my signature in the presence of two witnesses.

HARRY RANDOLPH VAN DEVENTER.

Witnesses:
 EDNA B. ISLER,
 E. H. RHAME.